United States Patent Office 3,403,039
Patented Sept. 24, 1968

3,403,039
BETA-KETOETHYL ONIUM SALTS AS
GELATIN HARDENERS
Burton D. Wilson, Rochester, N.Y., assignor to Eastman
Kodak Company, Rochester, N.Y., a corporation of
New Jersey
No Drawing. Original application June 29, 1964, Ser. No.
378,949, now Patent No. 3,345,177, dated Oct. 3, 1967.
Divided and this application Aug. 9, 1967, Ser. No.
659,316
10 Claims. (Cl. 106—125)

ABSTRACT OF THE DISCLOSURE

Gelatin coating compositions containing a hardening amount of a beta-ketoethyl onium salt, such as 3,8-decanedione-1,10-bis-(pyridinium perchlorate), 3,8-decanedione - 1,10 - bis(triphenylphosphonium perchlorate) and 3-pentanone-1,5-bis(pyridinium perchlorate), for example.

This application is a division of copending U.S. patent application Ser. No. 378,949, filed June 29, 1964, now Patent No. 3,345,177.

This invention relates to gelatin coating compositions containing beta-ketoethyl onium salts as hardeners therein.

Various compounds have been suggested as hardeners for gelatin but in many cases those hardeners have exhibited undesirable photographic effects or have been prone to wander from the layers in which they are placed. Some compounds considered as hardening agents have been objectionable because of their adverse physiological properties.

One object of my invention is to provide gelatin compositions containing compounds having a good hardening effect on the gelatin after forming coatings therefrom, particularly in preparing photographic products. Another object of my invention is to provide for the hardening of gelatin with compounds relatively free from undesirable photographic effects. A further object of my invention is to provide gelatin hardeners without undesirable physiological properties. A still further object of my invention is to provide gelatin coating compositions containing therein beta-ketoethyl onium salts as hardeners for the gelatin. Other objects of my invention will appear herein.

I have found that compositions comprising gelatin and a beta-ketoethyl onium salt are useful for obtaining coatings or layers which are resistant to the effects of hot water and to swelling. The compounds which are useful as gelatin hardeners in accordance with my invention are identified by the following formula:

$$B^+CH_2CH_2CO(ACO)_mCH_2CH_2B^+ \cdot 2X^-$$

where $X^-$ is an acid anion such as halide or perchlorate. $B^+$ represents a nitrogen, sulfur or phosphorus onium salt residue, such as ammonium, pyridinium, N-methylpiperidinium, sulfonium or phosphonium. $m=0$ or 1. A is a divalent linkage selected from the group consisting of $(CR_2)_{1-10}$ per se and $(CR_2)_{1-10}$ in which at least one $CR_2$ unit is replaced by a replacement selected from the group consisting of —CR=CR—, —O—, —S—, arylene and cycloalkylene radicals, R being selected from the group consisting of H and alkyl groups of 1–4 carbon atoms.

The onium residue $B^+$ may be one of the following:
(1) Pyridinium, either unsubstituted or containing common substituent groups as for example lower alkyl, hydroxyalkyl, benzyl, or the like.
(2) Trialkylammonium in which the alkyl groups are selected from those of 1 to 8 carbon atoms or in which two of the alkyl groups form with the nitrogen a heterocyclic ring such as piperidinium.
(3) Sulfonium in which the alkyl groups are selected from those of 1 to 8 carbon atoms or from a heterocyclic ring with the sulfur, as for example thiophanium.
(4) Phosphonium ($R_3P^+$), in which the R groups are selected from phenyl or lower alkyl groups of 1 to 8 carbon atoms.

Most of the hardeners in accordance with the invention may be conveniently prepared from the corresponding beta-haloethyl ketones, using as a solvent either acetonitrile or an excess of the sulfide or tertiary base reactant. In some cases it may be more convenient to prepare such compounds by alkylation of a bis-Mannich base, such as the following:

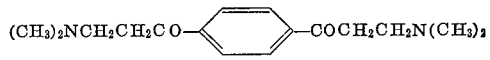

The hardeners employed are new, as well as their compositions with gelatin and with gelatin-containing photographic emulsions.

These compounds have been found to exhibit strong activity as gelatin hardeners with substantial freedom from undesirable photographic effects and toxicity. Ordinarily, the use of these hardeners involves incorporating them in an aqueous solution of gelatin such as a composition to be used in making photographic products or in a gelatin-silver halide photographic emulsion. The hardener is preferably incorporated in a gelatin composition in a proportion of 0.5–10 percent, based on the weight of the gelatin in the composition.

The following examples illustrate my invention.

Example 1.—3,8-decanedione-1,10-bis(pyridinium perchlorate)

4.78 grams of 1,10-dichloro-3,8-decanedione, the preparation of which is described in Example 1 of Burness and Wilson, application Ser. No. 379,018, filed June 29, 1964, now Patent No. 3,360,372, was dissolved in 25 ml. of dry pyridine and the solution was heated at 50° C. for one day. After cooling, the product was precipitated by diluting the mass with ether. The precipitate which formed was collected and a yield of 76 percent was noted, the product being the chloride salt. As this material was hygroscopic, it was converted to the perchlorate by a double decomposition reaction with sodium perchlorate. Recrystallization from water gave colorless crystals of 3,8-decanedione-1,10-bis(pyridinium perchlorate), having a melting point of 157–158° C.

This material was incorporated in a gelatin-silver bromide photographic emulsion in proportions of 1, 3 and 6 percent, based on the gelatin, and the various samples and a sample of the emulsion without hardener were each coated on cellulose acetate film support at a coverage of 432 mg. of silver and 980 mg. of gelatin per square foot. The emulsion layers containing the hardener prepared by this example exhibited greatly reduced swelling as compared with the emulsion layer without hardener therein. It was also found that the hardener was readily compatible with the photographic characteristics of the emulsion.

Example 2.—3,8-decanedione-1,10-bis(triphenylphosphonium perchlorate)

2.39 grams of 1,10-dichloro-3,8-decanedione and 5.25 grams of triphenylphosphine were dissolved in 50 ml. of acetonitrile and the solution was heated under reflux overnight. Upon removal of the solvent and the adding of benzene, the crude salt was precipitated in the form of the chloride. Being hygroscopic, this salt was converted to the perchlorate using sodium perchlorate and was recrystallized from methanol. Obtained were crystals of 3,8-decanedione - 1,10 - bis(triphenylphosphonium perchlorate), melting at 238–239° C. This material, when incorporated in gelatin-silver halide photographic emulsion in amounts of 3 percent and 6 percent, based on the weight of the gelatin, materially reduced the swelling of layers thereof in water as compared with a layer of this emulsion having no hardener added thereto.

Example 3.—3,12-tetradecanedione-1,14-bis (pyridinium perchlorate)

Example 1 was substantially repeated except that 1,14-dichloro-3,12-tetradecanedione was substituted for the 1,10-dichloro-3,8-decanedione. The starting material used here was prepared as described in Example 4 of application Ser. No. 379,018 of Burness and Wilson filed June 29, 1964. The reaction was carried out for three days and a yield of 98 percent of chloride salt was obtained. This salt was then converted to the perchlorate, which was recrystallized from water. This material melted at 135–138° C. This material was incorporated in samples of gelatin silver halide photographic emulsion in proportions of 1%, 3% and 6%, based on the weight of the gelatin, and layers thereof were compared with a layer of the emulsion having no hardener added thereto. It was found that the emulsion was considerably more resistant to swelling by water when the hardener, in accordance with my invention was incorporated therein in the various proportions.

Example 4.—3,8-decanedione-1,10-bis(tetramethylenesulfonium perchlorate)

A dibromo decanedione was prepared in the same manner as Example 1 of Burness and Wilson application Ser. No. 379,018 filed June 29, 1964 but using 49 grams of adipyl bromide and 98.3 grams of anhydrous aluminum bromide in 300 ml. of dibromomethane. The product obtained was precipitated with ether and crude dibromo decanedione was obtained in 91% yield. The material was recrystallized to obtain a product melting at 75–76° C. The adipyl bromide used had been prepared by heating a mixture of 292 grams of dry adipic acid and 180 grams of phosphorus tribromide in 200 ml. chlorobenzene at 60–75°. The following day, the unreacted adipic acid was filtered off and the oil obtained was concentrated in vacuo and purified by distillation.

6.56 grams of 1,10-dibromo-3,8-decanedione, prepared as described, was dissolved in 25 ml. of thiolane and the solution was allowed to stand at room temperature. After about four hours the mass had become solid and it was thinned with acetonitrile. The product obtained was collected and converted to the perchlorate by a double decomposition reaction. The product thus obtained, 3,8-decanedione - 1,10 - bis(tetramethylenesulfonium perchlorate) was purified by a recrystallization from water with seeding. This product melts with decomposition at 139–140°. The 3,8-decanedione-1,10-bis(tetramethylenesulfonium perchlorate) so prepared was incorporated in a gelatin-silver halide photographic emulsion composition in proportions of 1, 3 and 6%, based on the gelatin and the various samples were coated out onto cellulose acetate film support as was a sample of the emulsion without hardener. It was found that the layers containing the hardener in accordance with the invention were decidedly more resistant to the effects of swelling by water than was the emulsion layer without hardener.

Example 5

Silver halide photographic emulsions in which the solid portion of the vehicle was composed of 25% gelatin and 75% of the sodium salt of ethyl acrylate-acrylic acid copolymer (80:20 acrylate to acid) were coated on clear cellulose acetate film base at the rate of 750 mg./sq. ft. In two cases no hardener was used (controls) and in the other cases the hardeners designated were used in the proportions shown. The swell properties of the coatings are also indicated:

CONCENTRATION

| Hardener | Percent of gelatin | Percent of total vehicle [1] | Percent swell in water |
|---|---|---|---|
| Control | | | 440 |
| R-200 | 20 | 5 | 240 |
| Control | | | 500 |
| R-201 | 20 | 5 | 290 |
| R-202 | 20 | 5 | 170 |

[1] Consisted of 25% gelatin, 75% ethyl acrylate-acrylic acid (sodium salt) coated at about 750 mg./sq. ft. on a clear cellulose acetate film support.
R-200=3-pentanone-1,5-bis(pyridinium perchlorate).
R-20=2,2'-terephthaloyl bis(ethyl trimethyl ammonium p.t.s.).
R-202=3,8-dioxodecane-1,10-bis(pyridinium perchlorate).

In the formula $$B^+CH_2CH_2CO(ACO)_mCH_2CH_2B^+ \cdot 2X^-$$

representative compounds which are useful hardeners in accordance with the invention are as follows:

| A | Name |
|---|---|
| —CH=CH— | 4-octene-3,6-dione-1,8-bis(pyridinium perchlorate). |
| —CH$_2$CH$_2$OCH$_2$CH$_2$— | 6-oxa-3,9-undecanedione-1,11-bis(pyridinium perchlorate). |
| —CH$_2$CH$_2$SCH$_2$CH$_2$— | 6-thia-3,9-undecanedione-1,11-bis(pyridinium perchlorate). |
|  | 2,2'-hexahydroterephthaloyl bis(pyridinium perchlorate). |

The hardeners in accordance with the invention are useful in both gelatin coating compositions containing no mineral additive or pigment and in those containing a mineral material added thereto such as baryta coatings, silver-halide emulsions, and the like. The gelatin coating compositions in accordance with the invention are particularly valuable in the preparation of photographic products in which gelatin layers are desired, such as for subbing layers, photographic emulsion layers, overcoatings, antistatic backings, antihalation layers, and the like. As photographic products are subjected to aqueous processing baths, it is especially desirable that the gelatin layers exhibit good resistance to the swelling effects of water. The tests on the swelling of gelatin layers are made on samples which have been pre-incubated for three days at 100° F. and 50 percent relative humidity. The percent swell is conveniently measured as the percent vertical swell after five minutes in water at 68° F. using as the base value the thickness of the gelatin layer before immersion.

The hardeners of my invention can be used advantageously in gelatin-silver halide photographic emulsions in combination with other emulsion addenda referred to in the prior art or in emulsions which have been chemically sensitized in accordance with prior art procedures.

The invention has been described in considerable detail with particular reference to certain preferred embodiments thereof, but it will be understood that variations and modifications can be effected within the spirit and scope of the invention as described hereinabove, and as defined in the appended claims.

I claim:
1. A composition of matter comprising gelatin containing a hardening amount of a compound in accordance with the following formula:

$$B^+CH_2CH_2CO(ACO)_mCH_2CH_2B^+ \cdot 2X^-$$

wherein B$^+$ is selected from the group consisting of nitrogen, sulfur and phosphorus onion salt residues, $m = 0$ or $1$ A is divalent linkage selected from the group consisting of $(CR_2)_{1-10}$ per se and $(CR_2)_{1-10}$ in which at least one CR$_2$ unit is replaced by a replacement selected from the group consisting of —CR=CR—, —O—, —S—, arylene and cycloalkylene radicals, R being selected from the group consisting of H and alkyl groups of 1–4 carbon atoms, and X$^-$ is an acid anion.

2. A composition of matter in accordance with claim 1 comprising gelatin containing a hardening amount of 3,8-decanedione-1,10-bis(pyridinium perchlorate).

3. A composition of matter in accordance with claim 1 comprising gelatin containing a hardening amount of 3,8-decanedione-1,10-bis(triphenylphosphonium perchlorate).

4. A composition of matter in accordance with claim 1 comprising gelatin containing a hardening amount of 3,12-tetradecanedione-1,14-bis(pyridinium perchlorate).

5. A composition of matter in accordance with claim 1 comprising gelatin containing a hardening amount of 3,8-decanedione-1,10-bis(tetramethylene sulfonium perchlorate).

6. A composition of matter in accordance with claim 1 comprising gelatin containing a hardening amount of 3-pentanone-1,5-bis(pyridinium perchlorate).

7. A composition of matter in accordance with claim 1 comprising gelatin containing a hardening amount of a compound selected from the compounds having the following formulas:

(I)

$$B^+CH_2CH_2COACOCH_2CH_2B^+ \cdot 2X^-$$

and (II)

$$B^+CH_2CH_2COCH_2CH_2B^+ \cdot 2X^-$$

wherein $B^+$ is selected from the group consisting of nitrogen, sulfur and phosphorus onium salt residues, A is a divalent linkage selected from the group consisting of tetramethylene, octamethylene, vinylene, $$-CH_2CH_2OCH_2CH_2-$$

$-CH_2CH_2SCH_2CH_2-$, phenylene and cyclohexylene and $X^-$ is an acid anion.

8. A compositon of matter in accordance with claim 1 comprising gelatin containing a hardening amount of a compound having the formula:

$$B^+CH_2CH_2COACOCH_2CH_2B^+ \cdot 2X^-$$

wherein $B^+$ is selected from the group consisting of nitrogen, sulfur and phosphorus onium salt residues, A is a divalent linkage selected from the group consisting of tetramethylene, octamethylene, vinylene, $$-CH_2CH_2OCH_2CH_2-$$

$-CH_2CH_2SCH_2CH_2-$, phenylene and cyclohexylene and $X^-$ is an acid anion.

9. A composition of matter in accordance with claim 1 comprising gelatin containing a hardening amount of a compound having the formula:

$$B^+CH_2CH_2COCH_2CH_2B^+ \cdot 2X^-$$

wherein $B^+$ is selected from the group consisting of nitrogen, sulfur and phosphorus onium salt residues and $X^-$ is an acid anion.

10. A composition of matter in accordance with claim 1 comprising gelatin containing a hardening amount of a compound selected from the group consisting of 3,8-decanedione-1,10-bis(pyridinium acid anion), 3,8-decanedione - 1,10 - bis(triphenylphosphonium acid anion), 3,12-tetradecanedione-1,14-bis (pyridinium acid anion), 3,8-decanedione-1,10-bis(tetramethylene sulfonium acid anion), and 3-pentanone-1,5-bis(pyridinium acid anion).

References Cited
UNITED STATES PATENTS

| | | | |
|---|---|---|---|
| 3,305,376 | 2/1967 | Burness | 106—125 |
| 3,345,177 | 10/1967 | Wilson | 96—111 |

JAMES A. SEIDLECK, *Primary Examiner.*

T. MORRIS, *Assistant Examiner.*